(12) United States Patent
Green

(10) Patent No.: US 10,046,920 B1
(45) Date of Patent: Aug. 14, 2018

(54) SYSTEM AND METHODS FOR AUTOMATED SANITATION OF CONVEYER BELTS

(71) Applicant: Sanitec Green LLC, Portland, OR (US)

(72) Inventor: Charles Wesley Green, Portland, OR (US)

( * ) Notice: Subject to any disclaimer, the term of this patent is extended or adjusted under 35 U.S.C. 154(b) by 0 days.

(21) Appl. No.: 15/595,817

(22) Filed: May 15, 2017

(51) Int. Cl.
| | |
|---|---|
| *B65G 45/24* | (2006.01) |
| *B65G 45/16* | (2006.01) |
| *B65G 45/18* | (2006.01) |
| *B65G 45/22* | (2006.01) |
| *B08B 1/02* | (2006.01) |
| *B08B 3/04* | (2006.01) |

(52) U.S. Cl.
CPC ............ *B65G 45/24* (2013.01); *B08B 1/02* (2013.01); *B08B 3/041* (2013.01); *B65G 45/16* (2013.01); *B65G 45/18* (2013.01); *B65G 45/22* (2013.01)

(58) Field of Classification Search
CPC ........ B65G 45/16; B65G 45/18; B65G 45/22; B65G 45/24; B65G 45/26; B08B 1/02; B08B 3/041
USPC ......................................... 198/495, 496, 499
See application file for complete search history.

(56) References Cited

U.S. PATENT DOCUMENTS

| | | | | |
|---|---|---|---|---|
| 2,720,941 A * | 10/1955 | Carson | ............... | B65G 45/08 184/17 |
| 3,815,728 A * | 6/1974 | Vaughan | ............... | B65G 45/22 198/495 |
| 4,860,883 A * | 8/1989 | Knaul | ............... | A24C 5/1857 198/495 |
| 4,960,200 A * | 10/1990 | Pierce | ............... | B65G 45/22 198/495 |
| 5,170,968 A * | 12/1992 | Helmner | ............... | B60P 1/365 198/496 |
| 5,355,992 A * | 10/1994 | Baig | ............... | B65G 45/22 198/495 |
| 6,196,374 B1 * | 3/2001 | Kilgert | ............... | B65G 15/02 198/494 |
| 6,533,102 B2 * | 3/2003 | Franzoni | ............... | B05B 15/0418 198/495 |
| 6,820,734 B1 * | 11/2004 | Gilbert | ............... | B65G 45/16 198/499 |

(Continued)

*Primary Examiner* — Gene O Crawford
*Assistant Examiner* — Keith R Campbell
(74) *Attorney, Agent, or Firm* — Cionca IP Law P.C.; Marin Cionca

(57) ABSTRACT

A sanitation apparatus for cleaning a conveyer belt, having a housing; a float in a float chamber; a liquid reservoir; a liquid cleaning solution dispenser holding liquid cleaning solution and positioned above the housing; a tube dispensing the liquid cleaning solution into the float chamber, cleaning elements associated with the housing via a first set of compressible elements biasing the cleaning elements against the conveyer belt; a cylindrical roller connected to the housing via a second set of compressible elements biasing the cylindrical roller against the conveyer belt; the cylindrical roller being contained in the liquid reservoir such that a first portion is exposed to the liquid cleaning solution, and a second portion is in contact with the conveyer belt, engaging the cylindrical roller with the conveyer belt to cause transfer of a movement of the conveyer belt to the cylindrical roller and rotating the cylindrical roller.

18 Claims, 8 Drawing Sheets

(56) References Cited

U.S. PATENT DOCUMENTS

| | | | |
|---|---|---|---|
| 6,971,503 B2 * | 12/2005 | Thompson | B65G 45/22 198/494 |
| 8,201,682 B2 | 6/2012 | DeVries | |
| 8,579,102 B2 * | 11/2013 | Bryl | B65G 45/14 198/494 |
| 9,376,264 B1 | 6/2016 | Foley et al. | |
| 2010/0243410 A1 * | 9/2010 | Hall | B65G 45/18 198/495 |
| 2011/0067978 A1 * | 3/2011 | Carman | B65G 45/22 198/495 |

* cited by examiner

SYSTEM AND METHODS FOR AUTOMATED SANITATION OF CONVEYER BELTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to conveyer belts and more specifically to the automated cleaning of conveyer belts.

2. Description of the Related Art

Many grocery, retail, and other similar stores use conveyer belts at the checkout line or cashier for a customer's items. Through use, these conveyer belts can become dirty and contaminated, and may be unsafe for public use. This can particularly be a major problem when food items are being placed on the conveyer belts. However, most stores or other facilities may be unable to halt the lines or checkout processes in order to clean the conveyer belts between customers, as this could mean a loss of productivity and profits. Therefore, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an automated cleaning and sanitation system for a conveyer belt is provided, having a brush, a roller, at least a wiper, a reservoir for holding liquid cleaning solution, the liquid cleaning solution being dispensed by gravity from a liquid cleaning solution dispenser; the roller being housed within the reservoir and partially submerged in the cleaning solution and such that a portion of the roller is in contact with the cleaning solution while another portion of the roller is in contact with the conveyer belt and is rotated when the conveyer belt moves. An advantage may be that no additional energy is needed for the operation of the sanitation system, and the conveyer belt may be cleaned during normal use.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
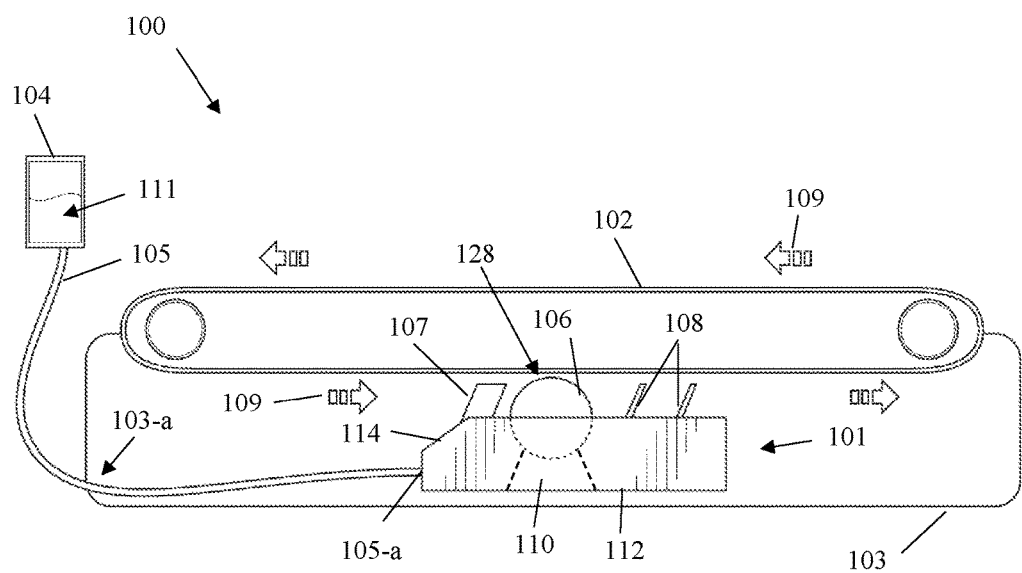
FIG. 1 is a diagram illustrating the cutaway left side view of a conveyer belt sanitation system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 108 and 208, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 is a diagram illustrating the cutaway left side view of a conveyer belt sanitation system 100, according to an aspect. The conveyer belt sanitation apparatus ("conveyer belt sanitation apparatus," or "sanitation apparatus") 101 may be used for the automated cleaning and sanitation of a conveyer belt 102 at a checkout station of a grocery, retail, or any other similar store or facility, during its use. Juices from meats, crumbs, liquid spills, and other similar food products may facilitate the growth of bacteria on the conveyer belt if left without cleaning. As another example, toxic spills (e.g., from liquid detergent containers) may contaminate food items. The sanitation apparatus 101 may allow for the conveyer belt 102 to be automatically cleaned and sanitized as it rotates during normal operation, and may rely on the operation of the conveyer belt itself for performing cleaning and/or sanitation actions, and may be installed into an existing conveyer belt station, or any conveyer belt station or the conveyor system may be constructed with the sanitation apparatus 101 included therein (integrated therein). Thus, an advantage may be that no user interaction is needed for the conveyer belt to be cleaned and/or sanitized. Another advantage may be that no energy outside of the operation of the conveyer belt may be needed for the cleaning and sanitation process.

The sanitation apparatus 101 may be housed within or underneath a counter or housing 103 having a conveyer belt 102, such that, during use, portions of the sanitation apparatus 101 may not be visible from the checkout station. The conveyer belt 102 may move through the sanitation apparatus 101 underneath the counter 103, and may thus be cleaned and sanitized as described hereinafter. Thus, an advantage may be that a separate cleaning procedure may not need to be performed by the user in order to clean the belt, and, again, user interaction may not be needed for engaging or actuating the sanitation apparatus 101. Another advantage may be that the life of the conveyer belt 102 may be lengthened due to the cleaning.

The system 100 may be provided with a gravity-fed liquid cleaning and/or sanitation solution dispenser 104 for dispensing cleaning and/or sanitation solution 111. The liquid cleaning solution dispenser 104 may be positioned at a first height, at a point higher than a second height of the sanitation apparatus housing 112. As an example, the dispenser 104 may be hung by any suitable means, or may rest on any surface above the sanitation apparatus 101. Thus, the liquid cleaning solution 111 within the dispenser 104 may fall towards the sanitation apparatus housing 112 by gravity. The solution dispenser 104 may, for example, be a half-gallon container, or any other suitable size which may be determined by the frequency of use of the conveyer belt. The cleaning solution 111 may comprise alcohol, which may facilitate the faster drying of the solution after being applied to the belt, and may also comprise detergent, soap, or any other suitable cleaning ingredients. As an example, the cleaning solution 111 may be an antibacterial or antimicrobial solution rated for killing 99.9% of the germs and bacteria present. As another example, the cleaning solution may comprise alcohol, such that the solution may quickly evaporate. An advantage may be that a separate drying step may not be needed for the cleaning process of the sanitation apparatus 101. The dispenser 104 may be suspended above the sanitation apparatus 101 for dispensing the cleaning solution 111 by gravity down to the apparatus. The dispenser 104 may feed cleaning solution 111 through a line or tube 105, which may lead to a holding reservoir ("holding reservoir," "liquid holding reservoir," "liquid reservoir," or "reservoir") 110 within the sanitation apparatus 101. The tube 105 may, for example, be integral with the sanitation apparatus 101 or may enter the apparatus 101 through, for example, a hole, represented by 105-*a*. The tube 105 may be inserted into the counter 103 through, for example, a hole represented by 103-*a*. Thus, the sanitation apparatus 101 may be hidden from view during normal operation. An advantage may be that additional space may not be needed to use the sanitation system 100 at a store checkout station or any facility having a conveyer belt. The sanitation apparatus 101 may also be compact, and may have only one solution holding reservoir 110. Thus, the sanitation apparatus 101 may be suitable for a variety of sizes of conveyer belts. The sanitation apparatus 101 may be provided to fit an 18 inch width conveyer belt, or a 24 inch width conveyer belt. As another example, the sanitation apparatus 101 may be adjustable such that a single model may be used for different sizes of conveyer belts and checkout stations, as will be further discussed when referring to FIGS. 7A-7B. As an example, the apparatus may contain a pocket as shown by 732 in FIGS. 7A-7B at the center of the housing ("housing" or "casing") 112 such that various pieces and components may slide into or out of the pocket, adjusting to a variety of sizes. A portion of the housing may be inserted into a pocket in the floor for storage such that the width is decreased. The pocket may also, for example, store additional components such as additional wipers, brushers, and rollers, and an additional portion of the housing such that the width may be increased by removing components from the pocket from storage and adding the components to the housing.

The sanitation apparatus 101 may be provided with the following exemplary cleaning components or elements: a brush 107, a roller ("sponge," or "roller") 106, and a plurality of wipers ("wiper," "wiper blade," "scraper," or "squeegee") 108. During normal operation, the conveyer belt 102 may turn, such as in the direction indicated by arrows 109, and may make contact with the cleaning components. Each of the cleaning components may be spring-loaded or secured to the apparatus by any other compressible element such that each cleaning element applies force to the belt, and such that the proper tension may be maintained between the components and the conveyer belt. Another advantage may be that the height of the cleaning components may be adjusted to fit underneath the belt when compressing the springs, and the sanitation apparatus 101 may fit into a variety of sizes of spaces. The sanitation apparatus 101 may rely on the turning of the conveyer belt 102 to turn the roller 106 due simply to frictional contact. Thus, again, an advantage may be that the sanitation system 100 may be environmentally friendly and may not require any energy in addition to the energy used for the conveyer belt itself in order to function, and cleaning of the belt may be performed simultaneously as the belt is in use.

For the automated cleaning of the conveyer belt 102 as it is being run during normal operation, the following exemplary process may occur. The roller 106 may be in contact with the belt, such as, for example, at point 128, and may be turned due to appropriate friction by the movement over the belt 102 overhead, moving in the directions indicated by arrows 109. Any other suitable means of transferring motion from the conveyor belt 102 to roller 106 may be employed, such a transmission belt between the transmission mechanism of the conveyor belt 102 and roller 106. As the belt rotates in the direction indicated by arrows 109, any dirty or contaminated areas of the belt 102 may first come into contact with the brush 107. The brush 107 may remove any loose particles or debris. The sanitation apparatus may be provided with a slanted or sloped rear end 114 to facilitate removal of the debris brushed away from the belt 102, and allow it to fall into a disposal area or waste receptacle (as shown by 524 in FIG. 5). The user may periodically remove this waste from the apparatus. Next, as the roller 106 turns while being exposed to the liquid cleaning solution 111 housed in the reservoir 110, the liquid 111 is applied to the belt 102. As the roller 106 rotates, a first portion may be in a downwards position in contact with the liquid cleaning solution with a second portion may be in an upwards position contact with the belt. The rotation of the roller 106 may cause the first portion to then turn from the downwards to the upwards position, in contact with the belt 102, and may thus apply cleaning solution to the belt. The roller may be constructed from any absorbent material, such as a sponge or rubber material, for example. The roller 106 may be cylindrical, and may have a length similar to the width of the conveyer belt, such that all areas of the belt may be cleaned by the application of cleaning solution to the belt by the roller 106. As the belt 102 continues to turn in the direction indicated by the arrows 109, the sections of the belt cleaned by the roller 106 may then be wiped dry of the applied cleaning liquid by the wipers 108 scraping the belt of cleaning liquid as it passes overhead. The roller may continue to pick up cleaning solution 111 as the belt turns 102, and the holding reservoir 110 may be refilled as the solution 111 is applied to the belt, wiped away and evaporated.

Figure 2:
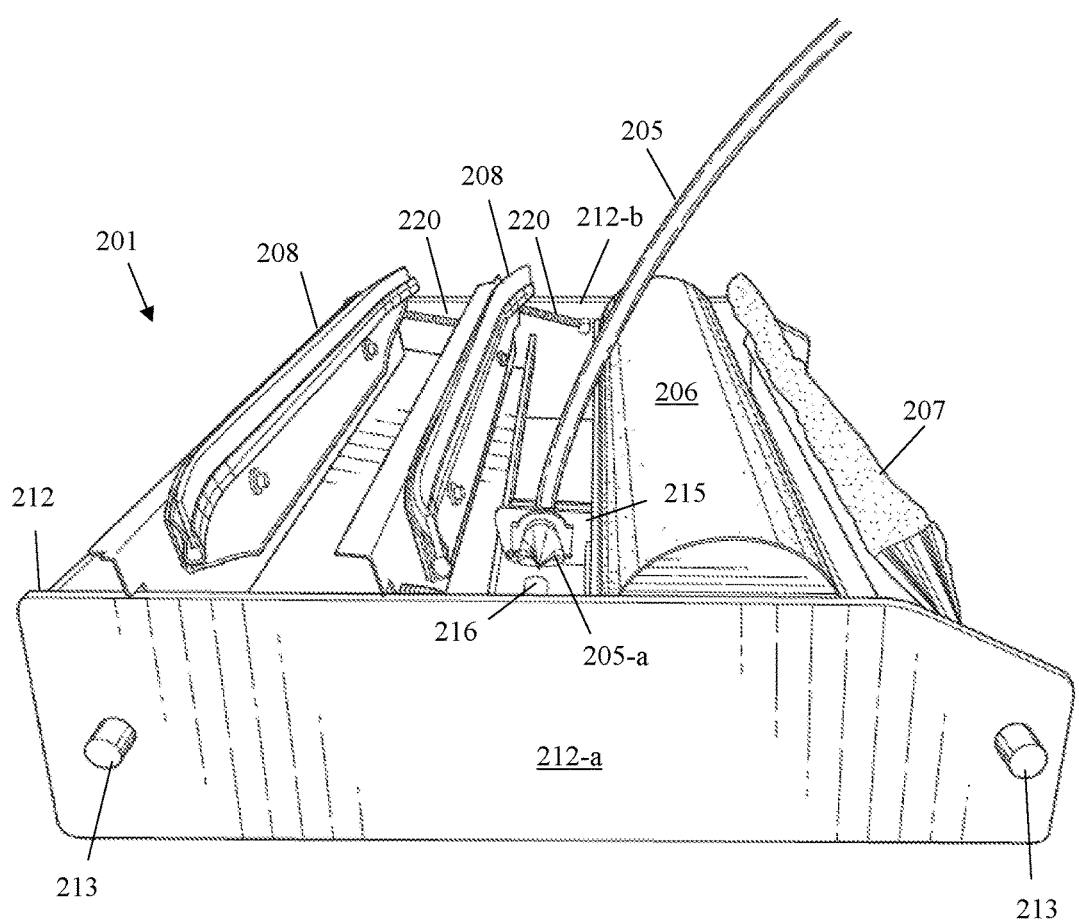
FIG. 2 illustrates the right side perspective view of the sanitation apparatus, according to an aspect.

FIG. 2 illustrates the right side perspective view of the sanitation apparatus 201, according to an aspect. The sanitation apparatus 201 may comprise a housing 212 having flat side panels 212-*a* and 212-*b*, for example. The wipers 208 and the brush 207 may be fitted and secured into the side panels 212-*a* and 212-*b* by any suitable means, such as, for example, on rods 213 inserted into the side panels, such that certain cleaning components are securely held in place in order to properly clean the belt. The wipers 208 may also be spring-loaded or held by any other compressible element, such that tension against the belt is created. The roller 206 may be rotatably associated with the side panels 212-*a* and 212-*b*, and may also be spring-loaded or held by any other compressible element, as will be further discussed when referring to FIG. 5. The bottom end 205-*a* of the tube 205 may be fitted into a tube holder 215, which may keep the bottom end 205-*a* in place. The tube 205 may then dispense cleaning solution into reservoir below the roller 206 until the level of the cleaning solution causes a float (partial view shown as 216, shown as 316 in FIG. 3) to rise and meet the end of the tube 205-*a*, which may then stop the flow of liquid, as will be further discussed when referring to FIG. 3.

Figure 3:
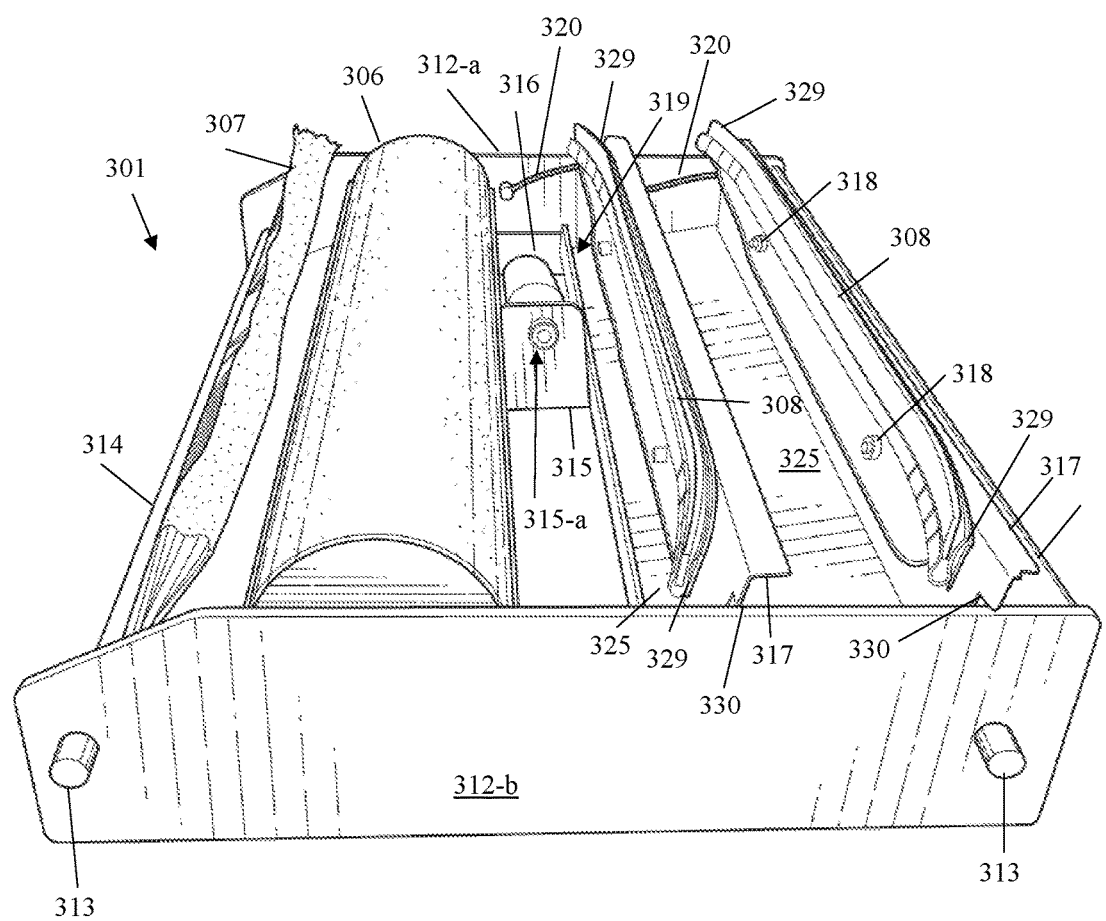
FIG. 3 illustrates the left side perspective view of the sanitation apparatus, according to an aspect.

FIG. 3 illustrates the left side perspective view of the sanitation apparatus 301, according to an aspect. The float ("float" or "floater") 316 may be held within a compartment or float chamber 319. The tube holder 315 may have a hole 315-*a* for receiving the tube (not shown for visual clarity, shown as 205 in FIG. 2) and may be integral with the float chamber 319. As an example, the tube holder 315 may be incorporated as a wall of the float chamber 319. The tube may be connected to the tube holder 315 by being inserted into the tube holder hole 315-*a*, and may then release liquid cleaning solution into the float holder 319. The float chamber 319 may be in communication with the reservoir below the roller 306, such that the liquid cleaning solution dispensed into the float chamber 319 may flow into the holding reservoir underneath the roller 306 (as shown by 110 in FIG. 1).

The float 316 may float on the surface of the cleaning solution, and when the level of cleaning solution is high enough such that the float 316 meets the hole 315-*a*, the float may block the opening of the tube. Thus, the float may be configured to stop the flow of liquid when it rises to a predetermined level. An advantage may be that the sanitation system may be provided with a means of preventing overflow of liquid, without any additional energy necessary.

Again, the sanitation apparatus 301 may be provided with a single wiper 308, or a plurality of wipers 308. As shown as an example, the sanitation apparatus 301 may include two wipers 308, which may have a curved shape. The lateral ends 329 of the wipers 308 may curve forward as shown towards the rear end 314 of the sanitation apparatus 301, such as, for example, towards the cylindrical roller 306. An advantage of the curved shape over a straight shape may be that the curved wiper may result in a better wipe and more complete drying of the belt. The wipers 308 may be secured to the side panels 312-*a* and 312-*b* by rods 313 and may also be secured to wiper panels 317. The wiper panels 317 may run lengthwise inside of the sanitation apparatus 301. Mounting of the wipers 308 to a wiper panel 317 may increase the height of the wipers and may allow the wipers 308 to reach the conveyer belt as it passes above. Another advantage may be that the wiper panels 317 may also help the wipers 308 to stay in an upright position, by, for example, a shoulder 330 on each wiper panel 317 as shown, which may lock into the side panels 321*a*-*b* to prevent rotation of the wiper-wiper panel assembly. Each wiper 308 may be secured into its associated wiper panel 317 any suitable means, such as, for example, screws or bolts 318. The wiper panels 317 and thus the wipers 308 may also be held by a compressible element 320, which may, for example, be a spring. An advantage may be that the proper amount of tension controlled by the compressible element 320 needed for a clean scrape of the belt may be achieved. Another advantage may be that the height of the wipers 308 may be adjustable by compressing the compressible element 320, such that the cleaning components of the sanitation apparatus 301 sitting underneath a conveyer belt may be securely pressed up against the belt. Within the interior space of the sanitation apparatus 301, the wipers 308 may sit on a sloped floor 325, such that any excess liquid wiped from the belt may be directed towards the reservoir (as shown by 510 in FIG. 5). An advantage may be that liquid cleaning solution used during the operation of the sanitation system is contained within the apparatus 301 and may not spill outside of the apparatus 301.

Figure 4:
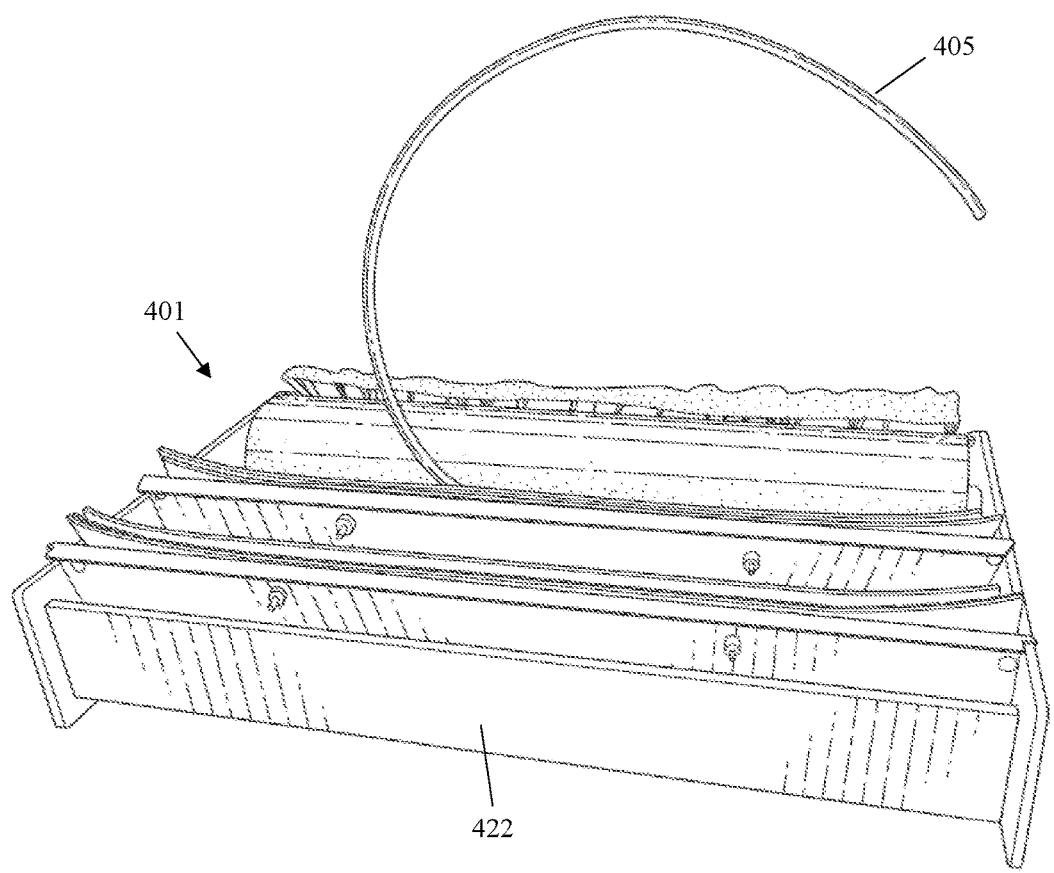
FIG. 4 illustrates the front perspective view of the sanitation apparatus, according to an aspect.
Figure 5:
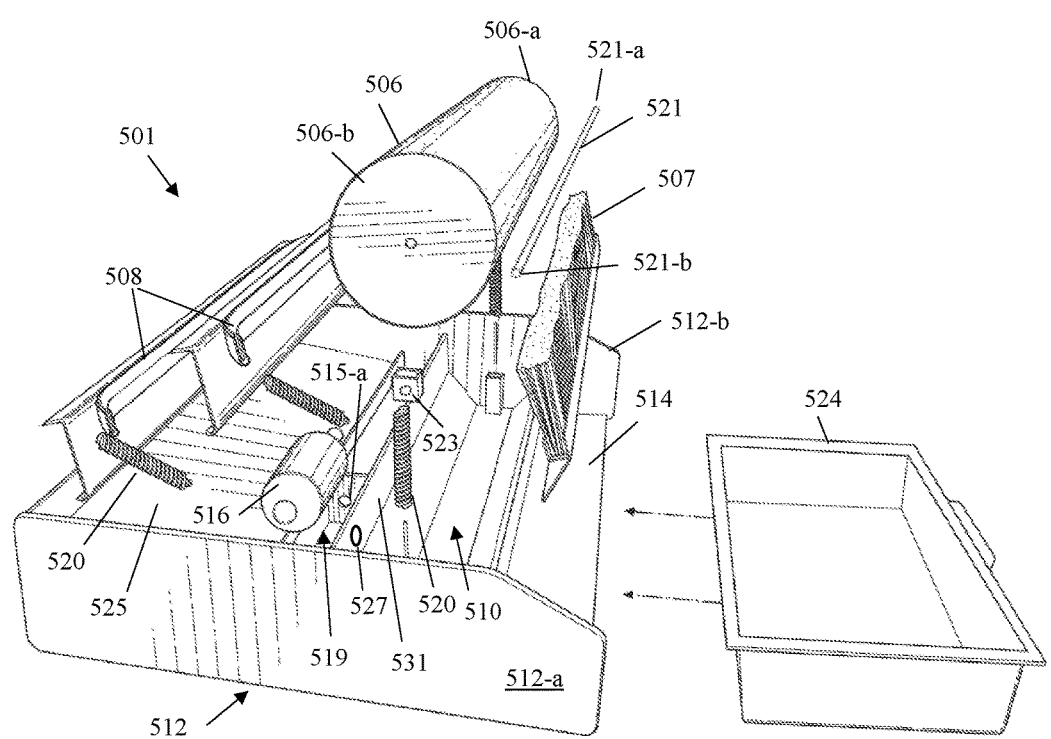
FIG. 5 illustrates the exploded right side view of the sanitation apparatus, according to an aspect.

FIG. 4 illustrates the front perspective view of the sanitation apparatus 401, according to an aspect. The front end 422 of the sanitation apparatus may be substantially perpendicular to the bottom. An advantage may be that liquid from the cleaning process and stray debris and food particles from the conveyer belt may be blocked from falling out of the front end, and instead may be directed towards the reservoir (as shown in FIG. 5) or a waste basket or tray (as shown in FIG. 5). A partial view of the tube 405 is shown, and the tube 405 may connect to a liquid cleaning solution dispenser, as shown in FIG. 1, and may be of any suitable length for ensuring that the solution may be directed into the apparatus 401 by gravity.

FIG. 5 illustrates the exploded right side view of the sanitation apparatus 501, according to an aspect. The reservoir 510 may be a recessed chamber in the floor of the sanitation apparatus housing 512, and may be in communication with the float chamber 519. As an example, the float chamber may have at least a wall, and may include a wall 531 between the float chamber and the liquid reservoir 510, connecting the float chamber 519 and the liquid reservoir 510 by an opening 527. The opening may be a hole or a passageway 527 between the float chamber and the liquid reservoir. The hole or passageway 527 may be configured such that liquid may flow from the float chamber 519 into the liquid reservoir 510. Thus, the reservoir 510 may be filled with liquid cleaning solution flowing from the float chamber 519 after receiving liquid from the tube (as shown by 205 in FIG. 2).

The float chamber 519 may house the float 516, which, again, may be configured to float at the surface of the liquid cleaning solution and rise to block the tube holder hole 515-a and thus stop the flow of liquid from the dispenser once the reservoir 510 has reached a predetermined capacity. As another example, the float 516 may be secured into the float chamber by any suitable means such that side-to-side movement may be restricted, thus, ensuring that the float 516 meets and blocks the tube holder hole 515-a when rising to a predetermined height.

The reservoir 510 may also receive the roller 506. The flow of liquid cleaning solution into the float chamber 519 and reservoir 510 may be directed by gravity and thus, the reservoir 510 may be continuously filled as the roller 506 picks up liquid and applies it to the conveyer belt. The roller 506 may partially lay within the reservoir 510, and may be partially submerged in the cleaning solution during use. The roller 506 may be rotatably connected to the housing via a spindle 521 through the center of the roller 506 lengthwise. The roller 506 may be in contact with the conveyer belt during operation of the belt, and the movement of the belt may cause the movement of the roller 506 about the spindle 521, such that the entire circumference of the roller 506 may be exposed to liquid solution and then to the belt, ensuring that the liquid solution is applied to the belt. The roller 506 may have two ends 506-a and 506-b, and a length, and the spindle 521 may also have two ends 521-a and 521-b and a length. The length of the spindle 521 may be longer than the length of the roller 506, such that the spindle ends 521-a and 521-b may be exposed at each roller end 506-a and 506-b. The ends of the spindle 521-a and 521-b may be associated with a compressible element via a spindle mount 523. Thus, the roller 506 may be raised out of the reservoir 510 or lowered further into the reservoir 510 when pressure is removed or applied to the roller 506. An advantage may be that controlled tension may be created between the roller 506 and the conveyer belt, such that constant and controlled (tension-wise) contact may be maintained between the roller 506 and the belt 102, which may ensure that the roller 506 is turned by the belt. Another advantage may be that the force of the roller 506 up against the belt may provide better application of the cleaning solution to the belt. Another advantage may be that the height of the roller 506 above the sanitation apparatus 501 may be adjustable as needed for fitting the apparatus underneath a conveyer belt to adjust to a variety of heights provided within the counter (as shown by 103 in FIG. 1). Again, the compressible elements 520 may be associated with mounts 523, which may be secured to or integral with the interior side of the side panels 512-a and 512-b.

The brush 507 may be associated with the housing 512 at the rear end 514 of the sanitation apparatus 501 by rods holding it in place (as shown in FIG. 2). As another example, the brush 507 may be associated with the housing 512 by compressible elements (not shown). Again, an advantage may be that the height of the brush 507 above the sanitation apparatus 501 may be adjustable as needed for fitting the apparatus underneath a conveyer belt with a counter. The rear end 514 may be sloped as shown, such that any debris or particles brushed from the conveyer belt may be directed towards a waste receptacle 524. The waste receptacle 524 may be a basket, tray, or any other suitable shape, and may sit underneath the sanitation apparatus 501 or, as another example, may be slid into a compartment underneath the sanitation apparatus 501.

Figure 6:
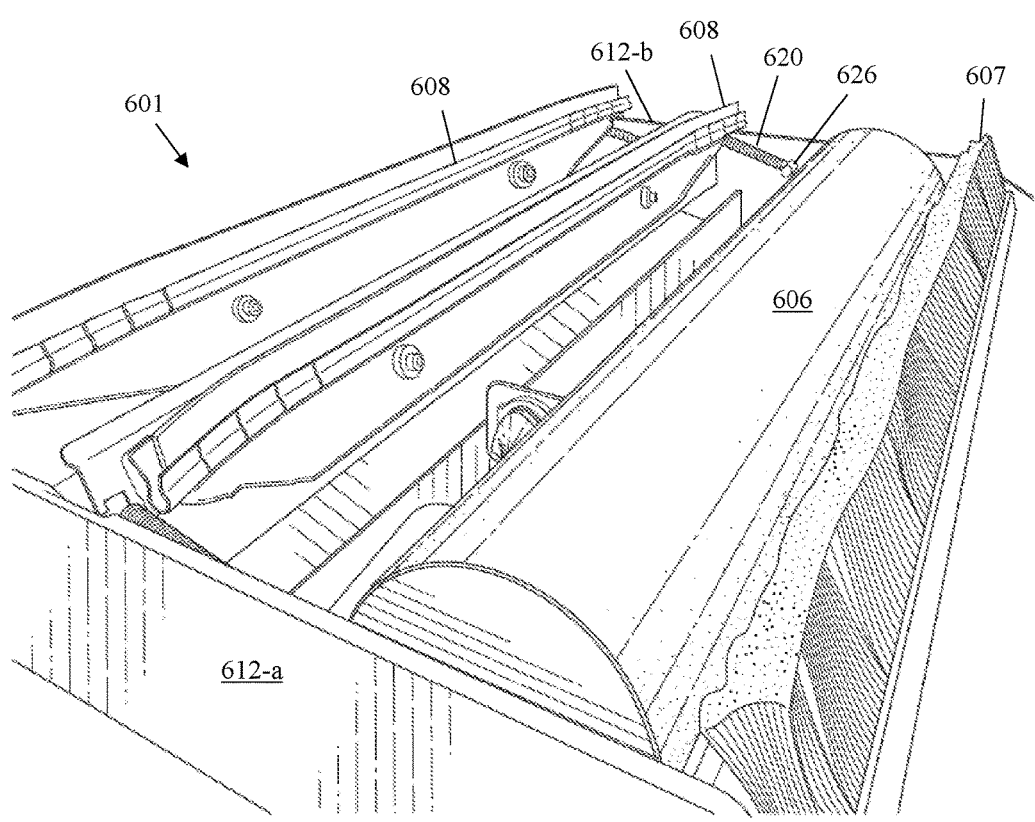
FIG. 6 illustrates the detailed top perspective view of the sanitation apparatus in an assembled state, according to an aspect.

The wipers 508 may rest on a sloped floor 525, and may be associated onto the apparatus side panels 512-a and 512-b with compressible elements 520 by, for example, mounts, screws, bolts, or any other suitable element, as will be further discussed when referring to FIG. 6. Again, an advantage may be that proper, controlled tension may be maintained between the wipers 508 and the belt, such that the wipers may apply controlled force to the belt. The control of the tension may be achieved by the type of compressible elements selected (e.g., having a particular extension/compression rate). The controlled tension may be provided as necessary to cleanly scrape and dry the belt. Again, another advantage may be that the height of the wipers may be adjusted when fitting the sanitation apparatus 501 into a counter (as shown by 103 in FIG. 1) and underneath a conveyer belt.

FIG. 6 illustrates the detailed top perspective view of the sanitation apparatus 601 in an assembled state, according to an aspect. Again, the wipers may be associated with compressible elements 620, which may be secured to the side panels 612-a and 612-b by any suitable means, such as a bolt or screw 626. The brush 607 may similarly be associated with the side panels 612-a and 612-b by any suitable means, such as a bolt or screw (not shown). Again, each cleaning component, such as the brush 607, roller 606, and wipers 608 may be associated with compressible elements such that tension is created and force is applied to the conveyer belt overhead during use.

Figure 7A:
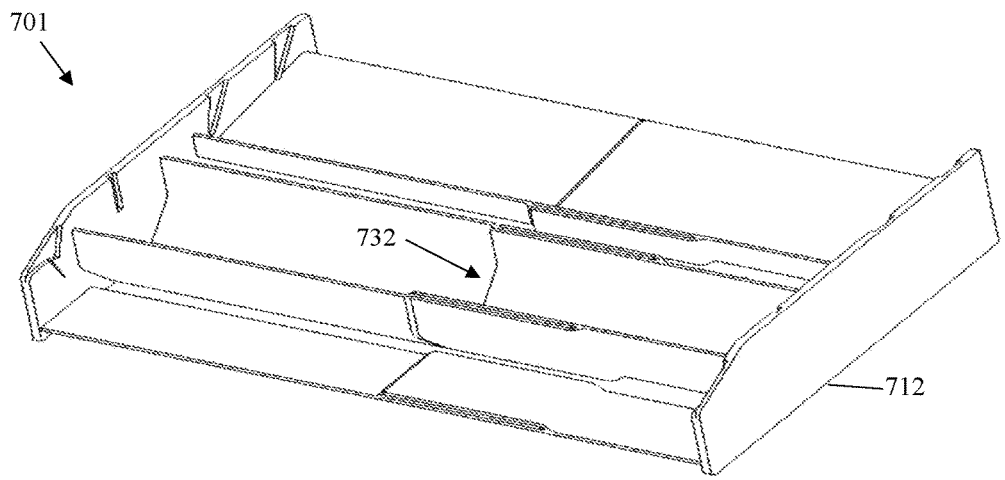
FIGS. 7A-7B illustrate a perspective view of an example of an adjustable sanitation apparatus in a shortened state and an extended state, respectively, according to an aspect.
Figure 7B:
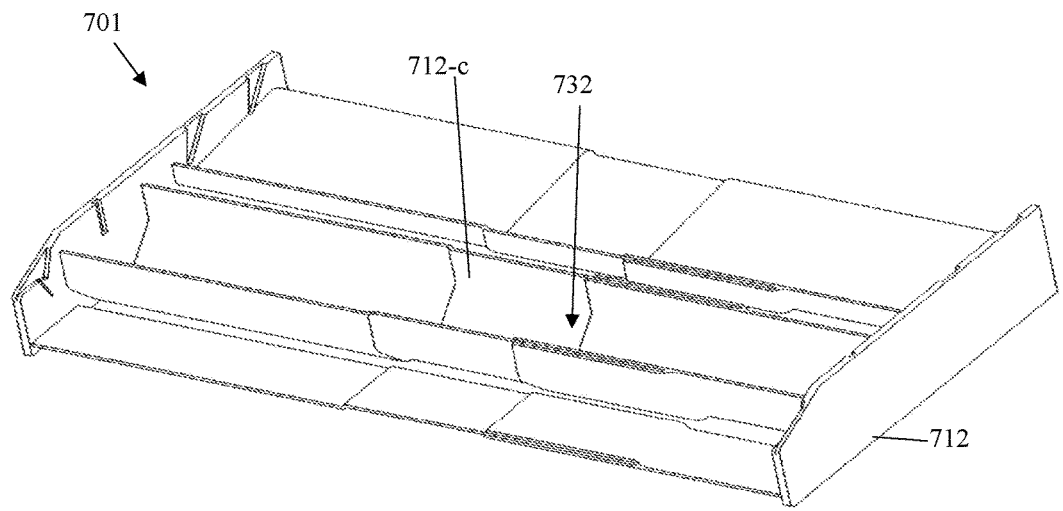

FIGS. 7A-7B illustrate a perspective view of an example of an adjustable sanitation apparatus 701 in a shortened state and an extended state, respectively, according to an aspect. The housing 712 is shown without components of the sanitation apparatus 701 inside, for visual clarity, and such that the pocket 732 can be shown. As an example, the apparatus may contain a pocket 732 at the center of the housing 112 such that various pieces and components may slide into or out of the pocket, adjusting the apparatus 701 to a variety of sizes. As discussed earlier, a portion of the housing may be inserted into a pocket in the floor for storage such that the width is decreased, and the sanitation apparatus 701 may thus be in a shortened state as shown in FIG. 7A. A portion of the housing may be removed from the pocket 732 and may remain exposed as shown by 712-c, and the sanitation apparatus 701 may thus be in an extended state as shown by FIG. 7B. The pocket may also, for example, store additional components such as additional wipers, brushers, and rollers, as well as the additional portion of the housing 712-c such that the width may be increased by removing components from the pocket from storage and adding the components to the housing. It should be understood that any other suitable method for extending or shortening the width of the sanitation apparatus may also be used for an adjustable sanitation apparatus 701.

Figure 8:
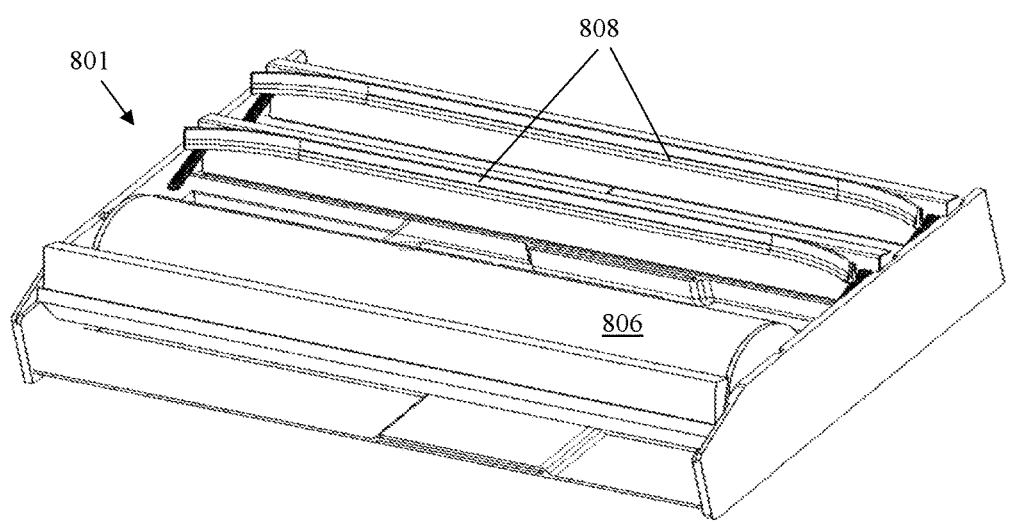
FIG. 8 illustrates a perspective view of the adjustable sanitation apparatus 801 of FIGS. 7A-7B shown with exemplary components, according to an aspect.

FIG. 8 illustrates a perspective view of the adjustable sanitation apparatus 801 of FIGS. 7A-7B shown with exemplary components including the roller 806 and wipers 808, according to an aspect. As shown, the roller 806 may sit on top of the portion of the housing containing the pocket 732 and may thus hide the appearance of the seam created by the pocket, for example.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or or examples. Hence, the scope of the invention is defined by the accompanying claims and their equivalents. Further, each and every claim is incorporated as further disclosure into the specification.

What is claimed is:

1. A sanitation apparatus for cleaning a conveyer belt moving in a circular loop, comprising:
    a housing having:
        a floor,
        a sloped front end,
        a rear end,
        a left side panel, and
        a right side panel;
    a float contained in a float chamber having:
        at least a wall;
    a liquid reservoir on the floor;
    a liquid cleaning solution dispenser holding liquid cleaning solution and positioned above the housing;
    a tube having:
        a first end associated with the dispenser, and
        a second end associated with and dispensing the liquid cleaning solution into the float chamber,
        the float chamber and the liquid reservoir being in communication such that the liquid reservoir receives the liquid cleaning solution from the float chamber through an opening;
    a plurality of cleaning elements associated with the housing via a first set of compressible elements biasing the plurality of cleaning elements against the conveyer belt;
    a cylindrical roller having:
        a length, and
        a circumference,
        the cylindrical roller being rotatably connected to the left side panel and the right side panel via a second set of compressible elements biasing the cylindrical roller against the conveyer belt;
    the cylindrical roller being contained in the liquid reservoir such that:
        a first portion of the cylindrical roller is in a downwards position exposed to the liquid cleaning solution, and
        a second portion of the cylindrical roller is in an upwards position in contact with the conveyer belt overhead,
        thus engaging the cylindrical roller with the conveyer belt to cause transfer of a movement of the conveyer belt to the cylindrical roller and rotating the cylindrical roller within the liquid reservoir,
        such that the first portion of the cylindrical roller moving from the downwards position to the upwards position applies the liquid cleaning solution to the conveyer belt, and the second portion moving from the upwards position to the downwards position collects the liquid cleaning solution onto the cylindrical roller,
        thus exposing the entire circumference of the cylindrical roller to the liquid cleaning solution and to the conveyer belt during a full rotation of the cylindrical roller, and
    wherein a width of the sanitation apparatus is adjustable by inserting a portion of the housing for storage into a pocket in the floor such that the width is decreased or removing a portion of the housing out of storage from the pocket such that the width is increased.

2. The sanitation apparatus of claim 1, further comprising a hole in the at least a wall of the float chamber for receiving and securing the second end of the tube;

the float being configured to sit onto a surface of the liquid cleaning solution within the float chamber and rise to block the second end of the tube when the liquid cleaning solution surface reaches a predetermined filled level, preventing the liquid cleaning solution from being dispensed from the tube, and lower when the liquid cleaning solution surface falls below the predetermined filled level to allow the liquid cleaning solution to be dispensed from the tube.

3. The sanitation apparatus of claim 2, wherein the plurality of cleaning elements comprises at least a brush.

4. The sanitation apparatus of claim 3, wherein the plurality of cleaning elements comprises at least a wiper blade, each one of the at least a wiper blade having a left lateral end and a right lateral end.

5. The sanitation apparatus of claim 4, wherein during operation, the sanitation apparatus is configured such that the conveyer belt is exposed first to the at least a brush, then exposed to the cylindrical roller, and then exposed to the at least a wiper blade.

6. The sanitation apparatus of claim 1, wherein the length of the roller is approximate to the width of the conveyer belt.

7. The sanitation apparatus of claim 1, wherein the at least a wall of the float chamber comprises a wall between the float chamber and the liquid reservoir and the opening comprises a passageway between the float chamber and the liquid reservoir.

8. The sanitation apparatus of claim 4, wherein each one of the at least a wiper is mounted on a wiper panel associated with the left side panel and the right side panel via the first set of compressible elements, the wiper panel having a left side shoulder and a right side shoulder for locking the wiper panel onto the left side panel and the right side panel.

9. The sanitation apparatus of claim 1, wherein the first set and the second set of compressible elements are spring-loaded.

10. The sanitation apparatus of claim 1, further comprising a waste receptacle.

11. The sanitation apparatus of claim 4, wherein the left lateral end and the right lateral end are curved towards the cylindrical roller.

12. The sanitation apparatus of claim 4, wherein a portion of the floor underneath the at least a wiper is sloped towards the cylindrical roller.

13. A sanitation apparatus for cleaning a conveyer belt moving in a circular loop, comprising:
    a housing having:
        a floor,
        a sloped front end,
        a rear end,
        a left side panel, and
        a right side panel;
    a liquid reservoir on the floor;
    a liquid cleaning solution dispenser holding liquid cleaning solution and positioned above the housing;
    a float contained in a float chamber having:
        at least a wall;
    a tube having:
        a first end associated with the dispenser; and
        a second end associated with and dispensing the liquid cleaning solution into the float chamber,
        the float chamber and the liquid reservoir being in communication;
    a hole in the at least a wall of the float chamber for receiving and securing the second end of the tube;
    the float being configured to:
        sit onto a surface of the liquid cleaning solution within the float chamber, and
        rise to block the second end of the tube when the liquid cleaning solution surface reaches a predetermined filled level, preventing the liquid cleaning solution from being dispensed from the tube, and
        lower when the liquid cleaning solution surface falls below the predetermined filled level to allow the liquid cleaning solution to be dispensed from the tube;
    a plurality of cleaning elements associated with the housing;
    a cylindrical roller having:
        a length, and
        a circumference,
        the cylindrical roller being rotatably connected to the left side panel and the right side panel via a first set of compressible elements biasing the cylindrical roller against the conveyer belt;
    the cylindrical roller being contained in the liquid reservoir such that:
        a first portion of the cylindrical roller is in a downwards position exposed to the liquid cleaning solution, and
        a second portion of the cylindrical roller is in an upwards position in contact with the conveyer belt overhead,
        thus engaging the cylindrical roller with the conveyer belt to cause transfer of a movement of the conveyer belt to the cylindrical roller and rotating the cylindrical roller within the liquid reservoir, such that the first portion of the cylindrical roller moving from the downwards position to the upwards position applies the liquid cleaning solution to the conveyer belt and the second portion moving from the upwards position to the downwards position collects the liquid cleaning solution onto the cylindrical roller, exposing the entire circumference of the cylindrical roller to the liquid cleaning solution and to the conveyer belt during a full rotation of the cylindrical roller;
    wherein a width of the sanitation apparatus is adjustable by inserting a portion of the housing for storage into a pocket in the floor such that the width is decreased or removing a portion of the housing out of storage from the pocket such that the width is increased.

14. The sanitation apparatus of claim 13, wherein the plurality of cleaning elements comprises at least a brush.

15. The sanitation apparatus of claim 13, wherein the plurality of cleaning elements comprises at least a wiper blade, each one of the at least a wiper blade having a left lateral end and a right lateral end and wherein the left lateral end and the right lateral end are curved towards the cylindrical roller.

16. A sanitation apparatus for automatic cleaning of a conveyer belt, comprising:
    a housing comprising:
        a floor having:
            a front end portion,
            a rear end portion, and
            a middle portion disposed between the front end portion and the rear end portion,
            wherein the front end portion of the floor is sloped down toward the middle portion and the rear end portion is sloped down away from the middle portion;
    the housing further comprising:
        a brush extending over the rear end portion of the floor,
        a left side panel, and a right side panel;

a cylindrical roller extending over the middle portion and being rotatably connected to the left side panel and the right side panel via a first set of compressible elements biasing the cylindrical roller away from the floor;

a wiper extending over the front end portion of the floor and being associated with the housing via a second set of compressible elements biasing the wiper away from the floor;

a cleaning solution dispenser for storing and dispensing a cleaning solution, positioned above the housing and being connected via a tube with a float chamber having a floater, the float chamber being in communication with a liquid reservoir, the floater and the float chamber being configured to block access of the cleaning solution within the float chamber when the cleaning solution reaches a predetermined level therein;

wherein the liquid reservoir extends under the cylindrical roller such that to cause the cylindrical roller to collect the cleaning solution dispensed therein during the cylindrical roller's rotation.

17. The sanitation apparatus of claim 16, the wiper having a left lateral end and a right lateral end and wherein the left lateral end and the right lateral end are curved towards the cylindrical roller.

18. The sanitation apparatus of claim 16, wherein the first set and the second set of compressible elements are spring-loaded.

* * * * *